(12) United States Patent
Nakamura et al.

(10) Patent No.: US 7,839,013 B2
(45) Date of Patent: Nov. 23, 2010

(54) POWER SUPPLY DEVICE FOR VEHICLE AND METHOD OF CONTROLLING THE SAME

(75) Inventors: Makoto Nakamura, Okazaki (JP);
 Hichirosai Oyobe, Toyota (JP);
 Tsuyoshi Yano, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 269 days.

(21) Appl. No.: 11/990,025

(22) PCT Filed: Jul. 27, 2006

(86) PCT No.: PCT/JP2006/315363

§ 371 (c)(1),
(2), (4) Date: Feb. 5, 2008

(87) PCT Pub. No.: WO2007/018107

PCT Pub. Date: Feb. 15, 2007

(65) Prior Publication Data

US 2009/0160247 A1 Jun. 25, 2009

(30) Foreign Application Priority Data

Aug. 8, 2005 (JP) ............................. 2005-229850

(51) Int. Cl.
 *B60L 1/00* (2006.01)
 *B60L 3/00* (2006.01)
 *H02G 3/00* (2006.01)
(52) U.S. Cl. ...................... 307/9.1; 307/10.1
(58) Field of Classification Search .................. 307/9.1, 307/10.1; 318/139
See application file for complete search history.

(56) References Cited

U.S. PATENT DOCUMENTS 5,883,496 A * 3/1999 Esaki et al. .................. 320/132

(Continued)

FOREIGN PATENT DOCUMENTS

JP A-07-170610 7/1995

(Continued)

OTHER PUBLICATIONS

Electric Power Vehicle, China Communications Press, Version 1, Jan. 2003, cover pages and p. 58.

(Continued)

*Primary Examiner*—Jared J Fureman
*Assistant Examiner*—Carlos Amaya
(74) *Attorney, Agent, or Firm*—Oliff & Berridge, PLC

(57) ABSTRACT

A power supply device for a vehicle includes a battery (B1) which serves as a first power storage device, a battery (B2) which serves as a second power storage device, a vehicle load, a selection switch (RY0) which selects one of the first and second power storage devices and connects the selected power storage device to the vehicle load, and a control device (60) which, when a current flowing through the selection switch (RY0) is larger than a prescribed value, controls the vehicle load so that the current flowing through the selection switch (RY0) is made smaller than the prescribed value, and switches the selection switch. Preferably, when the control device (60) switches the selection switch (RY0), the control device controls inverters (20, 30) to achieve a balance between electric power generated in a first motor generator (MG2) and electric power consumed in a second motor generator (MG1).

19 Claims, 11 Drawing Sheets

U.S. PATENT DOCUMENTS

| | | | |
|---|---|---|---|
| 6,522,034 B1 | 2/2003 | Nakayama | |
| 6,794,846 B2 | 9/2004 | Tsuji | |
| 7,151,326 B2 * | 12/2006 | Jordan | 307/22 |
| 2003/0057908 A1 | 3/2003 | Kusaka et al. | |
| 2004/0160201 A1 * | 8/2004 | Rahman et al. | 318/41 |

FOREIGN PATENT DOCUMENTS

| | | |
|---|---|---|
| JP | A-08-126121 | 5/1996 |
| JP | A-09-093807 | 4/1997 |
| JP | A-2000-217201 | 8/2000 |
| JP | A-2001-078356 | 3/2001 |
| JP | A-2003-023703 | 1/2003 |
| JP | A-2003-102181 | 4/2003 |
| JP | A-2003-153597 | 5/2003 |
| JP | A-2003-235169 | 8/2003 |
| JP | A-2004-027844 | 1/2004 |
| JP | A-2004-136731 | 5/2004 |
| JP | A-2005-033899 | 2/2005 |
| JP | A-2005-170086 | 6/2005 |

OTHER PUBLICATIONS

Jul. 28, 2010 Office Action issued in Chinese patent application No. 200680029271.3 (with translation).

* cited by examiner

| CONTROL DURING CHARGING | VOLTAGE STEP UP CONVERTER | | FIRST INVERTER | | SECOND INVERTER | |
|---|---|---|---|---|---|---|
| | Q1 | Q2 | Q11 | Q12 | Q21 | Q22 |
| VAC>0:(V1>V2) | ON | OFF | OFF OR SWITCHING | SWITCHING | OFF | ON |
| VAC<0:(V1<V2) | ON | OFF | OFF | ON | OFF OR SWITCHING | SWITCHING |

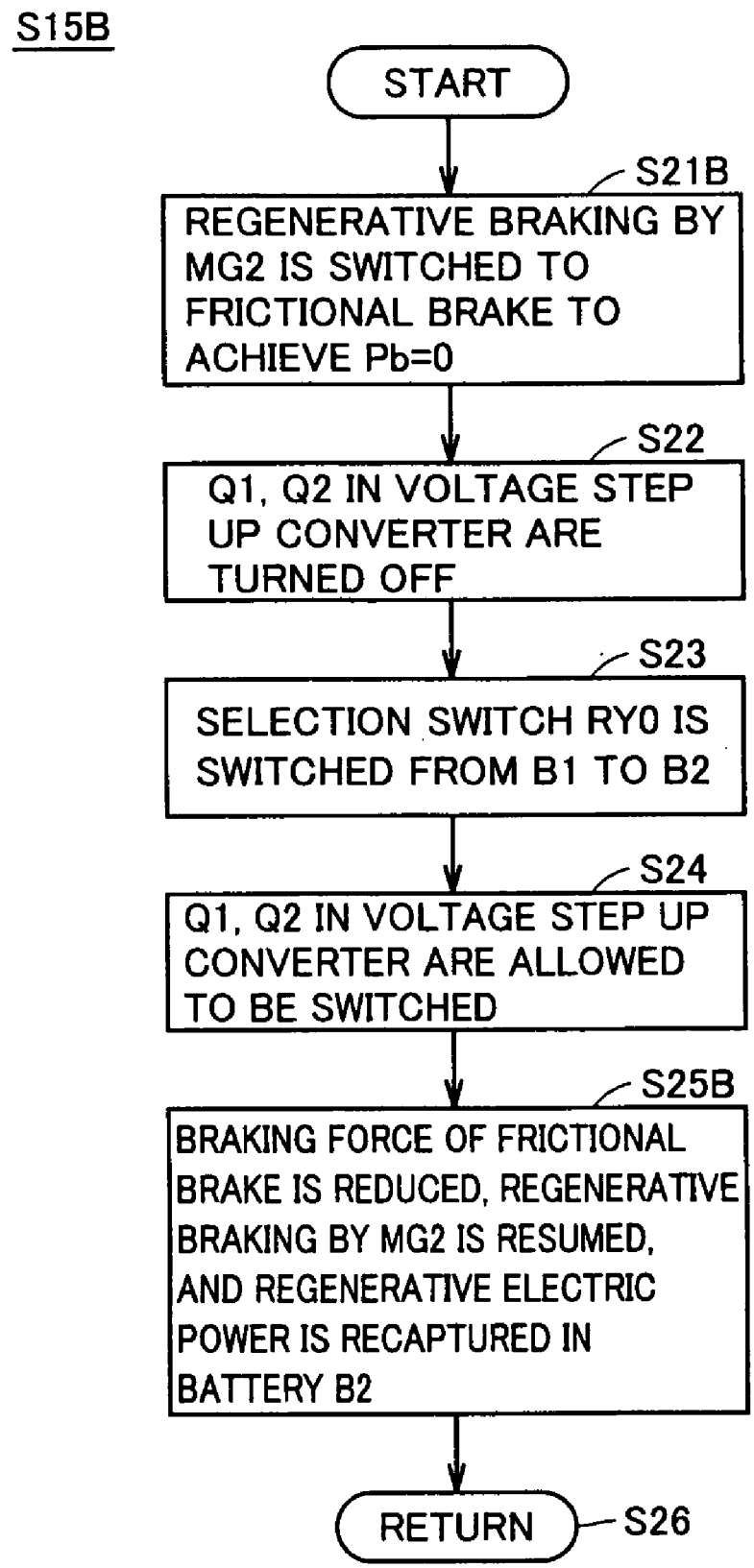

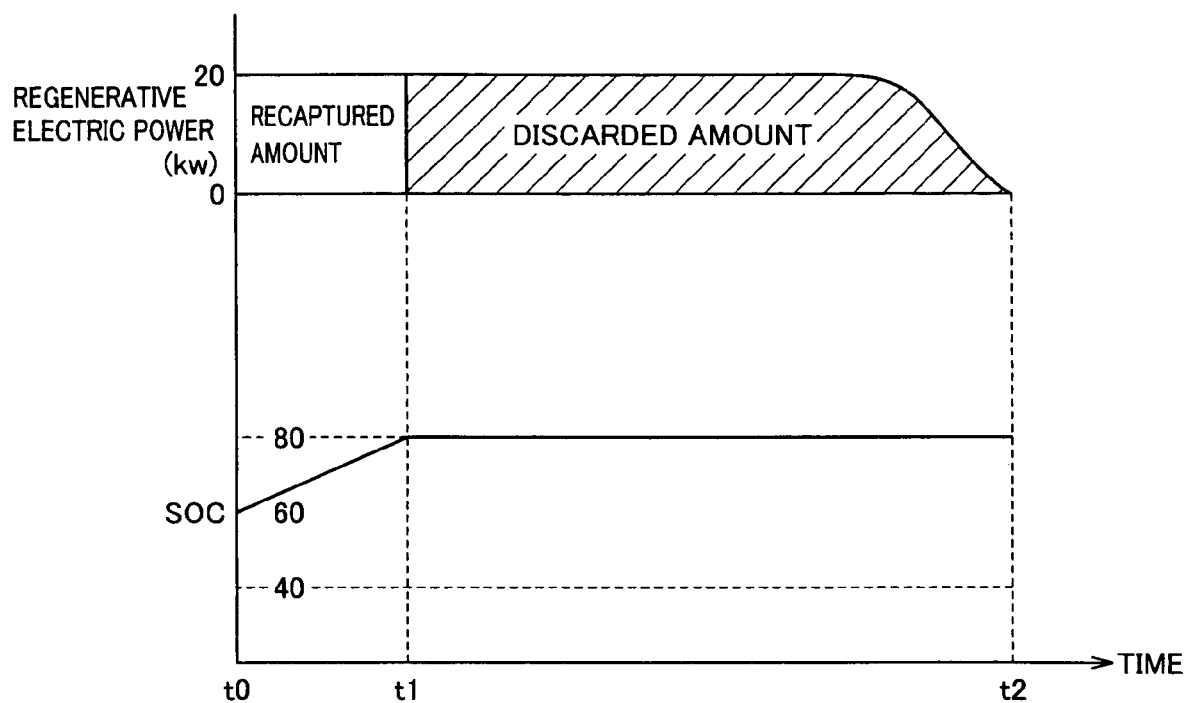

US 7,839,013 B2

POWER SUPPLY DEVICE FOR VEHICLE AND METHOD OF CONTROLLING THE SAME

TECHNICAL FIELD

The present invention relates to a power supply device for a vehicle, and particularly to a power supply device for a vehicle, having two power storage devices.

BACKGROUND ART

In recent years, attention has been focused on an electric vehicle and a fuel-cell vehicle that use a motor in driving a wheel, a hybrid vehicle that uses a motor and an engine in combination, and other vehicles, as an environmental-friendly vehicle.

For example, an electric vehicle requires a charging device for charging a battery. The charging device may be mounted on a vehicle, or provided at a certain location in a fixed manner.

In the case where the charging device is provided at a certain location in a fixed manner, it is necessary to move the electric vehicle to that place for charging. In other words, providing the charging device in a fixed manner is disadvantageous in that the battery cannot be charged at a place other than the place where the charging device is provided in a fixed manner.

In contrast, if the charging device is mounted on the vehicle, there exists a problem of increase in vehicle weight. In order to solve the problem, there has been proposed a device that charges a battery from a commercial power supply at home by using a coil of a drive motor as a reactor, and by controlling a circuit element of an inverter that controls the motor. As to this device, the existing part is utilized so that the number of parts to be newly mounted is reduced, and weight increase is avoided.

Japanese Patent Laying-Open No. 8-126121 discloses a technique of preventing rotation of a rotor in an electric vehicle by allowing magnetic fields generated by three-phase coils to cancel one another, in order to prevent movement of the vehicle caused by the rotor rotation, when the coils of the drive motor are used as a reactor to charge a battery.

If an electric vehicle as well as a hybrid vehicle can be charged from a commercial power supply at home, there may be a merit in that the frequency at which one has to go to the gas station for refueling is decreased, or may be an economical merit in a country where commercial electric power is inexpensive.

However, the Japanese Patent Laying-Open No. 8-126121 relates to an electric vehicle having two drive motors mounted on the left and right sides or the front and rear sides thereof, and hence the disclosure cannot be applied as it is to the hybrid vehicle.

Furthermore, a hybrid vehicle commercially available at present has a storage battery with low capacity, and hence even if the battery can be charged at home, an amount of energy to be supplied at that time is small. Accordingly, just after the vehicle runs for a while, a state of charge (SOC) of the storage battery decreases and the engine is required to start for activating an electric generator to generate electric power. Therefore, refueling with petrol is frequently required.

Furthermore, the hybrid vehicle performs regenerative braking in a downslope and recaptures electric power at that time to charge the storage battery. However, the capacity of the storage battery is so small that, when a running route includes a long downslope, electric power generated by regenerative braking is discarded as heat, once a state of charge of the storage battery reaches a prescribed value.

FIG. 15 is a diagram for describing electric power discarded as heat during regenerative braking.

With reference to FIG. 15, the storage battery is controlled such that it is used within 40-80% of the SOC range, for example, so as not to shorten its life. When the SOC of the storage battery is 60% at time t0, chargeable capacity is only 20%.

In the case of a long downslope, the storage battery is charged with regenerative electric power generated at time t0-t1. As a result, the SOC of the storage battery increases from 60% to 80%.

If the storage battery is further charged during a period from time t1 to time t2 at which the slope ends, the life of the storage battery may be shortened. The regenerative electric power generated is therefore discarded as heat. If even a part of electric power to be discarded can be recaptured, it is possible to implement a hybrid vehicle with higher energy efficiency.

DISCLOSURE OF THE INVENTION

An object of the present invention is to provide a power supply device for a vehicle, mounted with a power storage device, having improved energy efficiency, and capable of being driven for long time without the need of refueling.

To summarize, the present invention is a power supply device for a vehicle. The power supply device for the vehicle includes: a first power storage device; a second power storage device; a vehicle load; a selection switch which selects one of the first and second power storage devices and connects the selected power storage device to the vehicle load; and a control device which makes a current flowing through the selection switch smaller than a prescribed value by controlling the vehicle load and switches the selection switch, when the current flowing through the selection switch is larger than the prescribed value.

Preferably, the vehicle load includes a first rotating electric machine, a first inverter provided to correspond to the first rotating electric machine, a second rotating electric machine, and a second inverter provided to correspond to the second rotating electric machine. When the control device switches the selection switch, the control device controls the first and second inverters to achieve a balance between electric power generated in the first rotating electric machine and electric power consumed in the second rotating electric machine.

More preferably, motive power is mechanically transmitted between a rotary shaft of the first rotating electric machine and a wheel. The vehicle includes an internal combustion engine, motive power being mechanically transmitted between a rotary shaft of the second rotating electric machine and a crankshaft of the internal combustion engine.

Preferably, the vehicle load includes a first rotating electric machine, a first inverter provided to correspond to the first rotating electric machine, and an apparatus performing at least one of cooling and heating. When the control device switches the selection switch, the control device controls the first inverter and the apparatus to achieve a balance between electric power generated in the first rotating electric machine and electric power consumed in the apparatus.

Preferably, the vehicle load includes a rotating electric machine having a rotary shaft coupled to a wheel via means for mechanically transmitting motive power. The vehicle includes a brake which frictionally brakes the wheel. The control device causes the first rotating electric machine to restrict a regenerative braking operation and operates the brake in response to a braking demand, when the control device switches the selection switch.

Preferably, when switching of the selection switch is completed, the control device brings a control state of the vehicle load back to a state prior to the switching of the selection switch.

Preferably, the second power storage device has a power storage capacity higher than a power storage capacity of the first power storage device.

Preferably, the first power storage device has a maximum capable output electric power larger than a maximum capable output electric power of the second power storage device.

Preferably, the power supply device for the vehicle further includes an input unit for receiving electric power provided from an outside of the vehicle and charging at least the second power storage device.

More preferably, the vehicle load includes a first rotating electric machine, a first inverter provided to correspond to the first rotating electric machine, a second rotating electric machine, and a second inverter provided to correspond to the second rotating electric machine. The input unit includes a first terminal connected to the first rotating electric machine, and a second terminal connected to the second rotating electric machine. The power supply device for the vehicle further includes the control device which controls the first and second inverters such that alternating-current electric power provided to the first and second terminals is converted into direct-current electric power and provided to the second power storage device.

Further preferably, motive power is mechanically transmitted between a rotary shaft of the first rotating electric machine and a wheel. The vehicle includes an internal combustion engine, motive power being mechanically transmitted between a rotary shaft of the second rotating electric machine and a crankshaft of the internal combustion engine.

According to another aspect, the present invention is a method of controlling a power supply device for a vehicle, the power supply device for the vehicle having a first power storage device, a second power storage device, a vehicle load, and a selection switch which selects one of the first and second power storage devices and connects the selected power storage device to the vehicle load. The method includes: the step of making a current flowing through the selection switch smaller than a prescribed value by controlling the vehicle load, when the current flowing through the selection switch is larger than the prescribed value; and the step of switching the selection switch after making the current flowing through the selection switch smaller than the prescribed value.

Preferably, the vehicle load includes a first rotating electric machine, a first inverter provided to correspond to the first rotating electric machine, a second rotating electric machine, and a second inverter provided to correspond to the second rotating electric machine. The step of making the current smaller than the prescribed value controls the first and second inverters to achieve a balance between electric power generated in the first rotating electric machine and electric power consumed in the second rotating electric machine.

More preferably, motive power is mechanically transmitted between a rotary shaft of the first rotating electric machine and a wheel. The vehicle includes an internal combustion engine, motive power being mechanically transmitted between a rotary shaft of the second rotating electric machine and a crankshaft of the internal combustion engine.

Preferably, the vehicle load includes a first rotating electric machine, a first inverter provided to correspond to the first rotating electric machine, and an apparatus performing at least one of cooling and heating. The step of making the current smaller than the prescribed value controls the first inverter and the apparatus to achieve a balance between electric power generated in the first rotating electric machine and electric power consumed in the apparatus.

Preferably, the vehicle load includes a rotating electric machine having a rotary shaft coupled to a wheel via means for mechanically transmitting motive power. The vehicle includes a brake which frictionally brakes the wheel. The step of making the current smaller than the prescribed value causes the first rotating electric machine to restrict a regenerative braking operation and operates the brake in response to a braking demand, when the selection switch is switched.

Preferably, the method of controlling the power supply device for the vehicle further includes the step of, when switching of the selection switch is completed, bringing a control state of the vehicle load back to a state prior to the switching of the selection switch.

Preferably, the second power storage device has a power storage capacity higher than a power storage capacity of the first power storage device.

Preferably, the first power storage device has a maximum capable output electric power larger than a maximum capable output electric power of the second power storage device.

According to the present invention, by mounting two batteries and charging the same, it is possible to increase a distance the vehicle can travel or time the vehicle can travel for, without refueling, and reduce the frequency of refueling. In addition, it is possible to increase a life of a switching portion for the two batteries.

BRIEF DESCRIPTION OF THE DRAWINGS

FIG. 14 is a flowchart showing a structure of a process relating to battery switching executed in a third embodiment.

FIG. 15 is a diagram for describing electric power discarded as heat during regenerative braking.

BEST MODES FOR CARRYING OUT THE INVENTION

Figure 1:
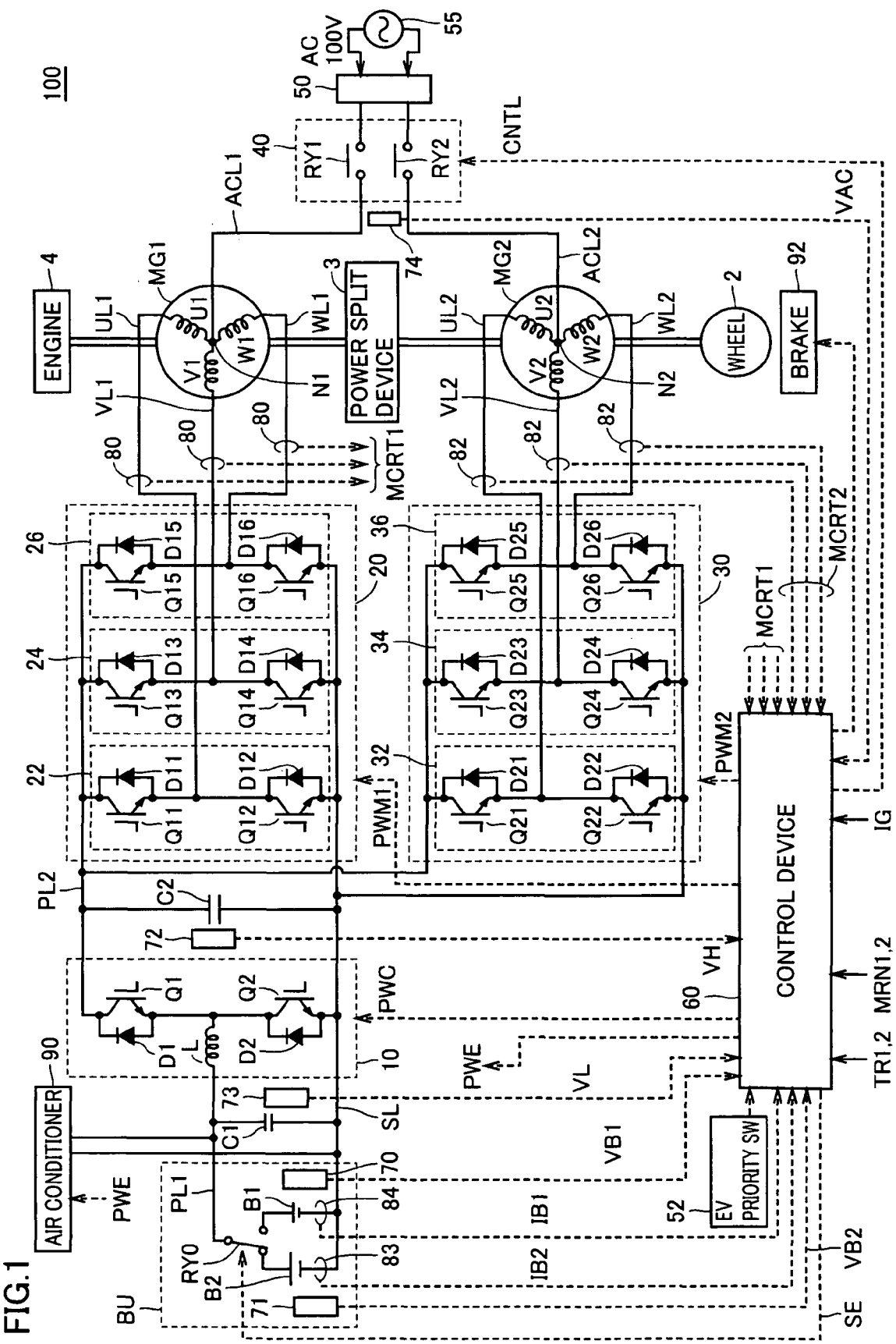
FIG. 1 is a schematic block diagram of a vehicle according to a first embodiment of the present invention.

Embodiments of the present invention will hereinafter be described in detail with reference to the drawings. The same or corresponding portions are provided with the same reference characters, and the description thereof will not be repeated.

First Embodiment

FIG. 1 is a schematic block diagram of a vehicle according to a first embodiment of the present invention.

With reference to FIG. 1, vehicle 100 includes a battery unit BU, a voltage step up converter 10, inverters 20, 30, power supply lines PL1, PL2, a ground line SL, U-phase lines UL1, UL2, V-phase lines VL1, VL2, W-phase lines WL1, WL2, motor generators MG1, MG2, an engine 4, a power split device 3, a wheel 2, a brake 92, and an air conditioner 90.

Vehicle 100 is a hybrid vehicle that uses a motor and an engine in combination for driving the wheel.

Power split device 3 is a mechanism connected to engine 4 and motor generators MG1, MG2 for distributing motive power among them. For example, a planetary gear mechanism having three rotary shafts of a sun gear, a planetary carrier, and a ring gear may be used for the power split device. The three rotary shafts are connected to rotary shafts of engine 4, motor generators MG1, MG2, respectively. For example, engine 4 and motor generators MG1, MG2 can mechanically be connected to power split device 3 by allowing a crankshaft of engine 4 to extend through the center of a hollow space in a rotor of motor generator MG1.

A rotary shaft of motor generator MG2 is coupled to wheel 2 through a reduction gear, a running gear, and the like not shown. A speed reducer for the rotary shaft of motor generator MG2 may further be incorporated inside power split device 3.

Motor generator MG1 is incorporated in the hybrid vehicle for operating as an electric generator driven by the engine and operating as an electric motor capable of starting the engine, while motor generator MG2 is incorporated in the hybrid vehicle for serving as an electric motor that drives a driving wheel of the hybrid vehicle.

Each of motor generators MG1, MG2 is, for example, a three-phase alternating synchronous electric motor. Motor generator MG1 includes three-phase coils composed of a U-phase coil U1, a V-phase coil V1, and a W-phase coil W1, as a stator coil. Motor generator MG2 includes three-phase coils composed of a U-phase coil U2, a V-phase coil V2, and a W-phase coil W2, as a stator coil.

Motor generator MG1 uses an engine output to thereby generate a three-phase alternating voltage, and outputs the generated three-phase alternating voltage to inverter 20. Furthermore, motor generator MG1 generates driving force by three-phase alternating voltage received from inverter 20 to thereby start the engine.

Motor generator MG2 generates driving torque for the vehicle by three-phase alternating voltage received from inverter 30. Furthermore, motor generator MG2 generates a three-phase alternating voltage during regenerative braking of the vehicle and outputs the same to inverter 30.

Battery unit BU includes batteries B1, B2 serving as power storage devices having negative electrodes both connected to a ground line SL, a selection switch RY0 that selects one of batteries B1, B2 and connects the selected battery to a vehicle load, voltage sensors 70, 71 that measure voltages of batteries B1, B2, respectively, and current sensors 84, 83 that measure currents of batteries B1, B2, respectively. The vehicle load includes motor generators MG1, MG2, inverters 20, 30, voltage step up converter 10 that supplies inverters 20, 30 with a stepped-up voltage, and air conditioner 90 which serves as an apparatus performing at least one of cooling and heating of the vehicle.

In battery unit BU, a combination of batteries B1, B2 is selected such that battery B2 has a power storage capacity higher than a power storage capacity of battery B, and instead that battery B1 has a maximum capable output electric power larger than a maximum capable output electric power of battery B2. In this case, battery B1 usually has maximum chargeable electric power larger than maximum chargeable electric power of battery B2. For example, battery B1 can store electric power of up to 20 kW, while battery B2 can store electric power of up to 5 kW.

A secondary battery such as a nickel metal hydride battery or a lithium-ion battery may be used for battery B1. In this case, an inexpensive, high-capacity, lead-acid battery may be used for battery B2.

Alternatively, a high-capacity electric double layer capacitor may be substituted for battery B1. In this case, a battery that has smaller maximum capable output electric power and a higher power storage capacity, when compared with the high-capacity electric double layer capacitor, may be used for battery B2. In this case, a secondary battery such as a nickel metal hydride battery or a lithium-ion battery may be used for battery B2.

In other words, as the performance of a power storage device improves, a combination of battery B1 and battery B2 may widely be varied for use. By combining and using two power storage devices having different characteristics, it is possible to implement the power supply device for the vehicle, capable of storing a large amount of electric power and having high output performance.

Battery unit BU outputs a direct voltage output from battery B1 or B2 to voltage step up converter 10. Furthermore, battery B1 or B2 inside battery unit BU is charged with a direct voltage output from voltage step up converter 10.

Selection switch RY0 is configured to assure that, when one of batteries B1 and B2 is connected to power supply line PL1, the other of batteries B1 and B2 is disconnected from power supply line PL1, in order to prevent a short-circuit between a positive electrode of battery B1 and a positive electrode of battery B2. This is because batteries B1, B2 are different in characteristic and sometimes different in state of charge (SOC), and hence it is necessary to avoid directly connecting the positive electrodes thereof to each other, so as to prevent a flow of an excessively large current from one to the other of the batteries.

Voltage step up converter 10 includes a reactor L, npn-type transistors Q1, Q2, and diodes D1, D2. Reactor L has one end connected to power supply line PL1, and the other end connected to a connection point of npn-type transistors Q1, Q2. Npn-type transistors Q1, Q2 are connected in series between power supply line PL2 and ground line SL, and each receives a signal PWC from a control device 60 at its base. Diodes D1, D2 are connected between the collectors and the emitters of npn-type transistors Q1, Q2, respectively, so that a current flows from the emitter side to the collector side.

For the npn-type transistor described above and the npn-type transistor described herein, an IGBT (Insulated Gate Bipolar Transistor) may be used. Furthermore, an electric power switching element such as a power MOSFET (Metal Oxide Semiconductor Field-Effect Transistor) may be substituted for the npn-type transistor.

Inverter 20 includes a U-phase arm 22, a V-phase arm 24, and a W-phase arm 26. U-phase arm 22, V-phase arm 24, and W-phase arm 26 are connected in parallel between power supply line PL2 and ground line SL.

U-phase arm 22 includes npn-type transistors Q11, Q12 connected in series. V-phase arm 24 includes npn-type transistors Q13, Q14 connected in series. W-phase arm 26 includes npn-type transistors Q15, Q16 connected in series. Diodes D11-D16 are connected between the collectors and the emitters of the npn-type transistors Q11-Q16, respectively, for allowing a current to flow from the emitter side to the collector side. The connection points of the npn-type transistors in the U, V, and W-phase arms are connected to coil ends different from a neutral point N1 of the U, V, and W-phase coils of motor generator MG1 through U, V, and W-phase lines UL1, VL1, and WL1, respectively.

Inverter 30 includes a U-phase arm 34, a V-phase arm 34, and a W-phase arm 36. U-phase arm 32, V-phase arm 34, and W-phase arm 36 are connected in parallel between power supply line PL2 and ground line SL.

U-phase arm 32 includes npn-type transistors Q21, Q22 connected in series. V-phase arm 34 includes npn-type transistors Q23, Q24 connected in series. W-phase arm 36 includes npn-type transistors Q25, Q26 connected in series. Diodes D21-D26 are connected between the collectors and the emitters of npn-type transistors Q21-Q26, respectively, for allowing a current to flow from the emitter side to the collector side. In inverter 30 as well, the connection points of the npn-type transistors in the U, V, and W-phase arms are also connected to coil ends different from a neutral point N2 of the U, V, and W-phase coils of motor generator MG2 through U, V, and W-phase lines UL2, VL2, and WL2, respectively.

Vehicle 100 further includes capacitors C1, C2, a relay circuit 40, a connector 50, an EV priority switch 52, control device 60, AC lines ACL1, ACL2, voltage sensors 72-74, and current sensors 80, 82.

Capacitor C1 is connected between power supply line PL1 and ground line SL, to reduce the effect caused by voltage fluctuations on battery B1 and voltage step up converter 10. A voltage VL between power supply line PL1 and ground line SL is measured by voltage sensor 73.

Capacitor C2 is connected between power supply line PL2 and ground line SL, to reduce the effect caused by voltage fluctuations on inverters 20, 30 and voltage step up converter 10. A voltage VH between power supply line PL2 and ground line SL is measured by voltage sensor 72.

Voltage step up converter 10 steps up a direct voltage supplied from battery unit BU through power supply line PL1 and outputs the same to power supply line PL2. More specifically, based on signal PWC from control device 60, voltage step up converter 10 performs a voltage step up operation by storing in reactor L a current flowing in accordance with a switching operation of npn-type transistor Q2, as magnetic field energy, and by releasing the stored energy by allowing a current to flow through diode D1 to power supply line PL2 in synchronization with a timing at which npn-type transistor Q2 is turned off.

Furthermore, based on signal PWC from control device 60, voltage step up converter 10 steps down a direct voltage received from one of, or both of inverters 20 and 30 through power supply line PL2 to a voltage level of battery unit BU, and charges the batteries inside battery unit BU.

Based on a signal PWM1 from control device 60, inverter 20 converts a direct voltage supplied from power supply line PL2 into a three-phase alternating voltage, and drives motor generator MG1.

Motor generator MG1 is thereby driven to generate torque specified by a torque command value TR1. Furthermore, based on signal PWM1 from control device 60, inverter 20 converts the three-phase alternating voltage, which is generated by motor generator MG1 that receives an output from the engine, into a direct voltage, and outputs the obtained direct voltage to power supply line PL2.

Based on a signal PWM2 from control device 60, inverter 30 converts the direct voltage supplied from power supply line PL2 into a three-phase alternating voltage, and drives motor generator MG2.

Motor generator MG2 is thereby driven to generate torque specified by a torque command value TR2. Furthermore, during regenerative braking of the hybrid vehicle mounted with vehicle 100, based on signal PWM2 from control device 60, inverter 30 converts the three-phase alternating voltage, which is generated by motor generator MG2 that receives a turning force from a drive shaft, into a direct voltage, and outputs the obtained direct voltage to power supply line PL2.

The regenerative braking referred to herein includes braking accompanied by regenerative power generation when a driver that drives the hybrid vehicle operates a foot brake, and deceleration (or termination of acceleration) of the vehicle while regenerative power is generated by lifting the driver's foot off from an accelerator pedal during running of the vehicle, without operating a foot brake. Furthermore, control device 60 performs braking such that the ratio between regenerative braking and frictional braking by brake 92 is varied as appropriate to obtain prescribed braking force, based on a magnitude of required braking force and another state of the vehicle.

Relay circuit 40 includes relays RY1, RY2. For relays RY1, RY2, a mechanical contact relay may be used, for example, or alternatively, a semiconductor relay may also be used. Relay RY1 is provided between AC line ACL1 and connector 50, and is turned on/off in accordance with a control signal CNTL from control device 60. Relay RY2 is provided between AC line ACL2 and connector 50, and is turned on/off in accordance with control signal CNTL from control device 60.

Relay circuit 40 connects/disconnects AC lines ACL1, ACL2 to/from connector 50 in accordance with control signal CNTL from control device 60. In other words, when receiving control signal CNTL at an H (logic high) level from control device 60, relay circuit 40 electrically connects AC lines ACL1, ACL2 to connector 50. When receiving control signal CNTL at an L (logic low) level from control device 60, relay circuit 40 electrically disconnects AC lines ACL1, ACL2 from connector 50.

Connector 50 is a terminal for inputting an alternating voltage from outside to neutral points N1, N2 of motor generators MG1, MG2. For the alternating voltage, an alternating current at 100V, for example, can be input from a commercial power line at home. A voltage VAC between AC lines ACL1 and ACL2 is measured by voltage sensor 74, and the measured value is transmitted to control device 60.

Voltage sensor 70 detects a battery voltage VB1 of battery B1, and outputs the detected battery voltage VB1 to control device 60. Voltage sensor 71 detects a battery voltage VB2 of battery B2, and outputs the detected battery voltage VB2 to control device 60.

Voltage sensor 73 detects a voltage across capacitor C1, namely, an input voltage VL to voltage step up converter 10, and outputs the detected voltage VL to control device 60.

Voltage sensor 72 detects a voltage across capacitor C2, namely, an output voltage VH from voltage step up converter 10 (which output voltage VH corresponds to input voltages to inverters 20, 30; the same applies to the following), and outputs the detected voltage VH to control device 60.

Current sensor 80 detects a motor current MCRT1 flowing through motor generator MG1, and outputs the detected motor current MCRT1 to control device 60. Current sensor 82 detects a motor current MCRT2 flowing through motor generator MG2, and outputs the detected motor current MCRT2 to control device 60.

Based on torque command values TR1, TR2 output from an ECU (Electronic Control Unit) externally provided and motor rotation speeds MRN1, MRN2 of motor generators MG1, MG2, voltage VL from voltage sensor 73, and voltage VH from voltage sensor 72, control device 60 generates signal PWC for driving voltage step up converter 10, and outputs the generated signal PWC to voltage step up converter 10.

Furthermore, based on voltage VH, and motor current MCRT1 and torque command value TR1 of motor generator MG1, control device 60 generates signal PWM1 for driving motor generator MG1, and outputs the generated signal PWM1 to inverter 20. Furthermore, based on voltage VH, and motor current MCRT2 and torque command value TR2 of motor generator MG2, control device 60 generates signal PWM2 for driving motor generator MG2, and outputs the generated signal PWM2 to inverter 30.

Based on a signal IG from an ignition switch (or an ignition key) and state of charge of battery B2 (SOC2), control device 60 generates signals PWM1, PWM2 for controlling inverters 20, 30 such that battery B2 is charged with an alternating voltage for a commercial power supply, which alternating voltage is supplied to neutral points N1, N2 of motor generators MG1, MG2.

Furthermore, based on state of charge of battery B2 (SOC2), control device 60 determines whether or not battery B2 can be charged from outside. When control device 60 determines that battery B2 can be charged, it outputs control signal CNTL at an H level to relay circuit 40. In contrast, when control device 60 determines that battery B2 is approximately fully charged and cannot be charged, it outputs control signal CNTL at an L level to relay circuit 40. When signal IG shows a stopped state, control device 60 stops inverters 20, 30.

In accordance with an instruction provided through EV priority switch 52 by a driver, control device 60 switches between a hybrid running mode in which consumption of petrol in a normal manner is a prerequisite and an EV priority running mode in which the vehicle runs only by a motor with the maximum torque made smaller than in the case of the hybrid running, and electric power in the battery is used as much as possible.

Furthermore, control device 60 controls, with a control signal PWE, air conditioner 90 that performs cooling, heating, or air blowing based on temperature settings and others set by a driver.

To prevent the life of the relay being shortened, when a current flowing through selection switch RY0 is larger than a prescribed value, control device 60 controls the vehicle load so that the current flowing through selection switch RY0 is made smaller than the prescribed value, and switches the selection switch. When switching selection switch RY0, control device 60 controls inverters 20, 30 to achieve a balance between electric power generated in motor generator MG2 and electric power consumed in motor generator MG1.

Figure 2:
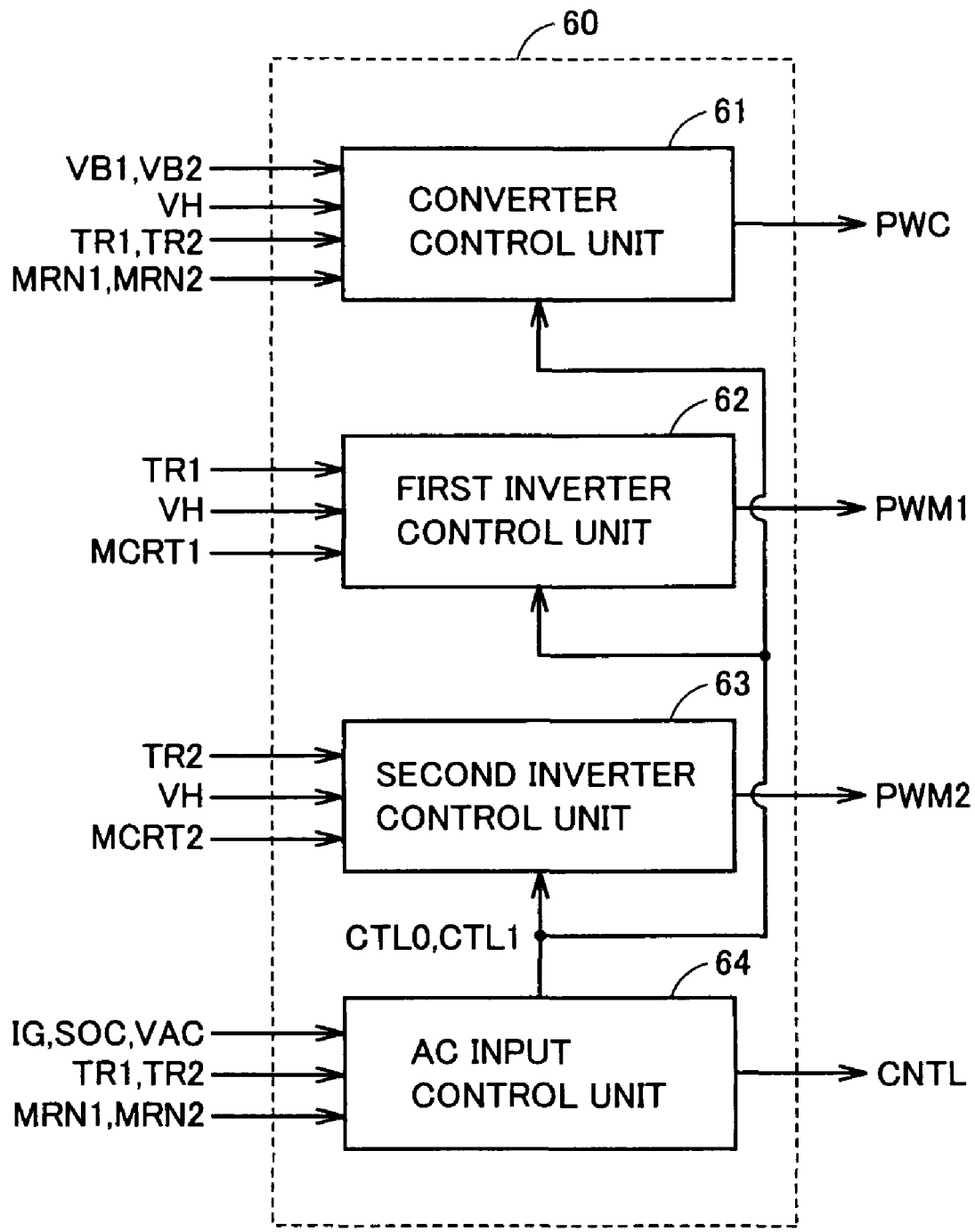
FIG. 2 is a functional block diagram of a control device 60 shown in FIG. 1.

FIG. 2 is a functional block diagram of control device 60 shown in FIG. 1.

With reference to FIG. 2, control device 60 includes a converter control unit 61, a first inverter control unit 62, a second inverter control unit 63, and an AC input control unit 64. Based on battery voltages VB1, VB2, voltage VH, torque command values TR1, TR2, and motor rotation speeds MRN1, MRN2, converter control unit 61 generates signal PWC for turning on/off npn-type transistors Q1, Q2 in voltage step up converter 10, and outputs the generated signal PWC to voltage step up converter 10.

Based on torque command value TR1 and motor current MCRT1 of motor generator MG1 and voltage VH, first inverter control unit 62 generates a signal PWM1 for turning on/off npn-type transistors Q11-Q16 in inverter 20, and outputs the generated signal PWM1 to inverter 20.

Based on torque command value TR2 and motor current MCRT2 of motor generator MG2 and voltage VH, second inverter control unit 63 generates a signal PWM2 for turning on/off npn-type transistors Q21-Q26 in inverter 30, and outputs the generated signal PWM2 to inverter 30.

Based on torque command values TR1, TR2 and motor rotation speeds MRN1, MRN2, AC input control unit 64 determines a driven state of each of motor generators MG1, MG2, and in accordance with signal IG and the SOC of each of batteries B1, B2, controls the two inverters in a coordinated manner to convert the alternating voltage supplied from outside into a direct current and steps up the voltage as well, and charges the battery.

Here, signal IG at an H level is a signal indicating that a hybrid vehicle mounted with vehicle 100 is activated, while signal IG at an L level is a signal indicating that the hybrid vehicle is stopped.

In the case where a driven state of each of motor generators MG1, MG2 is a stopped state and signal IG also indicates that the hybrid vehicle is stopped, and when the SOC of each of batteries B1, B2 is lower than a prescribed level, AC input control unit 64 permits a charging operation. Specifically, AC input control unit 64 brings relays RY1, RY2 into conduction by signal CNTL, and if there is an input of voltage VAC, generates a control signal CTL1 in accordance with the input, controls inverters 20, 30 in a coordinated manner, converts the alternating voltage supplied from outside into a direct current and steps up the voltage as well, so as to permit charging of the battery.

In contrast, in the case where a driven state of each of motor generators MG1, MG2 is a running state or signal IG indicates that the hybrid vehicle is being driven, and when the SOC of each of batteries B1, B2 is higher than a prescribed level, AC input control unit 64 does not permit a charging operation. Specifically, AC input control unit 64 causes relays RY1, RY2 to be released by signal CNTL, generates a control signal CTL0, and causes voltage step up converter 10 and inverters 20, 30 to perform a normal operation observed during driving of the vehicle.

Figure 3:
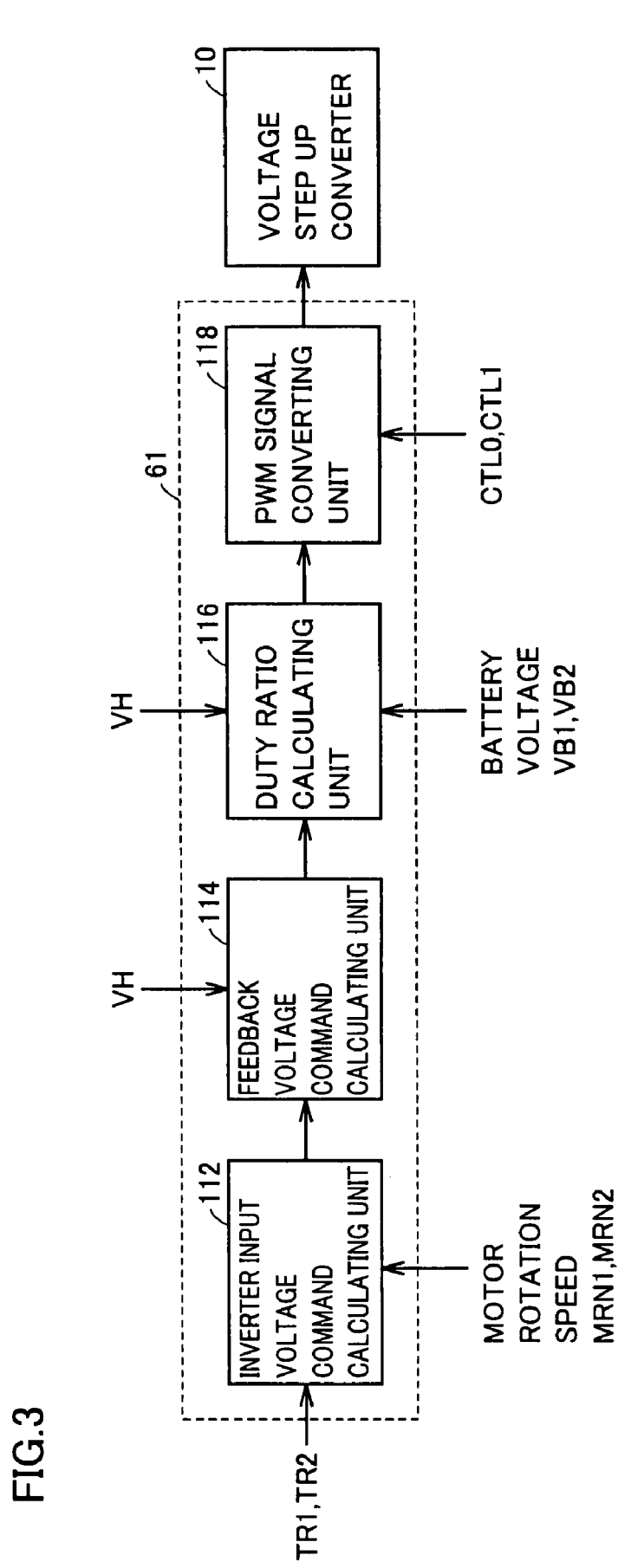
FIG. 3 is a functional block diagram of a converter control unit 61 shown in FIG. 2.

FIG. 3 is a functional block diagram of converter control unit 61 shown in FIG. 2.

With reference to FIG. 3, converter control unit 61 includes an inverter input voltage command calculating unit 112, a feedback voltage command calculating unit 114, a duty ratio calculating unit 116, and a PWM signal converting unit 118.

Based on torque command values TR1, TR2 and motor rotation speeds MRN1, MRN2, inverter input voltage command calculating unit 112 calculates an optimal value (target value), namely, a voltage command VH_com, of an inverter input voltage, and outputs the calculated voltage command VH_com to feedback voltage command calculating unit 114.

Based on output voltage VH of voltage step up converter 10 detected by voltage sensor 72 and voltage command VH_com from inverter input voltage command calculating unit 112, feedback voltage command calculating unit 114 calculates a feedback voltage command VH_com_fb for controlling output voltage VH to be voltage command VH_com, and outputs the calculated feedback voltage command VH_com_fb to duty ratio calculating unit 116.

Based on battery voltages VB1, VB2 from voltage sensor 70 and feedback voltage command VH_com_fb from feedback voltage command calculating unit 114, duty ratio calculating unit 116 calculates a duty ratio for controlling output voltage VH of voltage step up converter 10 to be a voltage command VH_com, and outputs the calculated duty ratio to PWM signal converting unit 118.

Based on the duty ratio received from duty ratio calculating unit 116, PWM signal converting unit 118 generates a PWM (Pulse Width Modulation) signal for turning on/off npn-type transistors Q1, Q2 in voltage step up converter 10, and outputs the generated PWM signal to npn-type transistors Q1, Q2 in voltage step up converter 10 as signal PWC.

By allowing npn-type transistor Q2 in the lower arm of voltage step up converter 10 to have a larger on duty, an amount of electric power to be stored in reactor L is increased, and hence it is possible to obtain an output at a higher voltage. In contrast, by allowing npn-type transistor Q1 in the upper arm to have a larger on duty, the voltage on power supply line PL2 is lowered. Accordingly, by controlling the duty ratio of each of npn-type transistors Q1, Q2, it is possible to control the voltage on power supply line PL2 to be an arbitrary voltage equal to or higher than the output voltage of battery B1.

Furthermore, when control signal CTL1 is activated, PWM signal converting unit 118 brings npn-type transistor Q1 into a conduction state, and brings npn-type transistor Q2 into a non-conduction state, regardless of an output of duty ratio calculating unit 116. It is thereby possible to allow a charging current to flow from power supply line PL2 to power supply line PL1.

Figure 4:
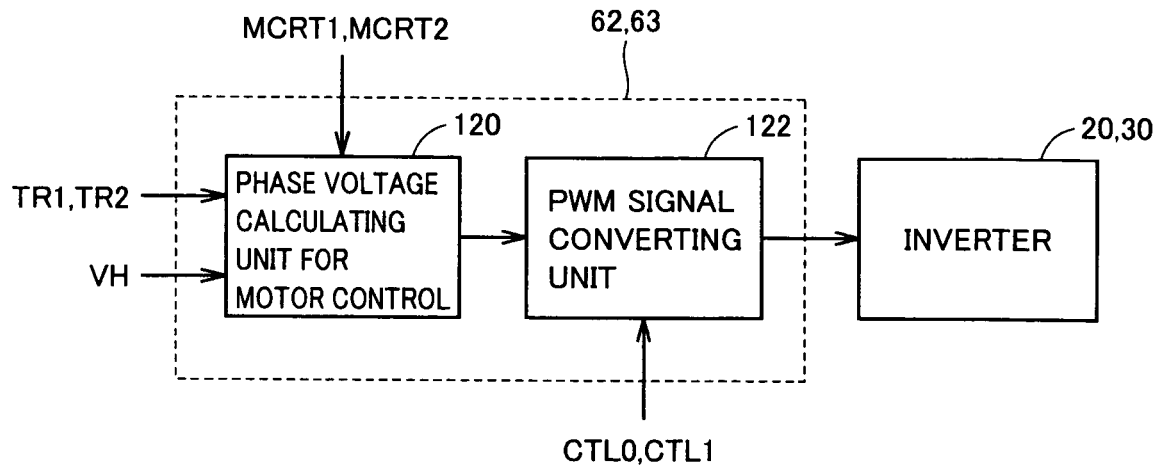
FIG. 4 is a functional block diagram of first and second inverter control units 62, 63 shown in FIG. 2.

FIG. 4 is a functional block diagram of first and second inverter control units 62, 63 shown in FIG. 2.

With reference to FIG. 4, each of first and second inverter control units 62, 63 includes a phase voltage calculating unit 120 for motor control, and a PWM signal converting unit 122.

Phase voltage calculating unit 120 for motor control receives input voltage VH of inverters 20, 30 from voltage sensor 72, receives from current sensor 80 (or 82) motor current MCRT1 (or MCRT2) flowing through the coil of each of the phases in motor generator MG1 (or MG2), and receives torque command value TR1 (or TR2) from the ECU. Based on these input values, phase voltage calculating unit 120 for motor control calculates a voltage to be applied to the coil of each of the phases in motor generator MG1 (or MG2), and outputs the calculated each-phase coil voltage to PWM signal converting unit 122.

When PWM signal converting unit 122 receives control signal CTL0 from AC input control unit 64, it generates a signal PWM10 (a type of signal PWM1) (or PWM2_0 (a type of signal PWM2)) that actually turns on/off each of npn-type transistors Q11-Q16 (or Q21-Q26) in inverter 20 (or 30), based on the each-phase coil voltage command received from phase voltage calculating unit 120 for motor control, and outputs the generated signal PWM1_0 (or PWM2_0) to each of npn-type transistors Q11-Q16 (or Q21-Q26) in inverter 20 (or 30).

As such, switching control is performed on each of npn-type transistors Q11-Q16 (or Q21-Q26), and a current to flow through each phase in motor generator MG1 (or MG2) is controlled such that motor generator MG1 (or MG2) outputs the commanded torque. As a result, motor torque in accordance with torque command value TR1 (or TR2) is output.

Furthermore, when PWM signal converting unit 122 receives control signal CTL1 from AC input control unit 64, it generates a signal PWM1_1 (a type of signal PWM1) (or PWM2_1 (a type of signal PWM2)) that turns on/off npn-type transistors Q1-Q16 (or Q21-Q26) such that an in-phase alternating current flows through U-phase arm 22 (or 32), V-phase arm 24 (or 34), and W-phase arm 26 (or 36) of inverter 20 (or 30), regardless of an output of phase voltage calculating unit 120 for motor control, and outputs the generated signal PWM1_1 (or PWM2_1) to npn-type transistors Q11-Q16 (or Q21-Q26) in inverter 20 (or 30).

When an in-phase alternating current flows through the U, V, and W-phase coils, no rotational torque is generated in motor generators MG1, MG2. By controlling inverters 20, 30 in a coordinated manner, alternating voltage VAC is converted into a direct charging voltage.

A method of generating a direct charging voltage in vehicle 100 from alternating voltage VAC for a commercial power supply will now be described.

Figure 5:
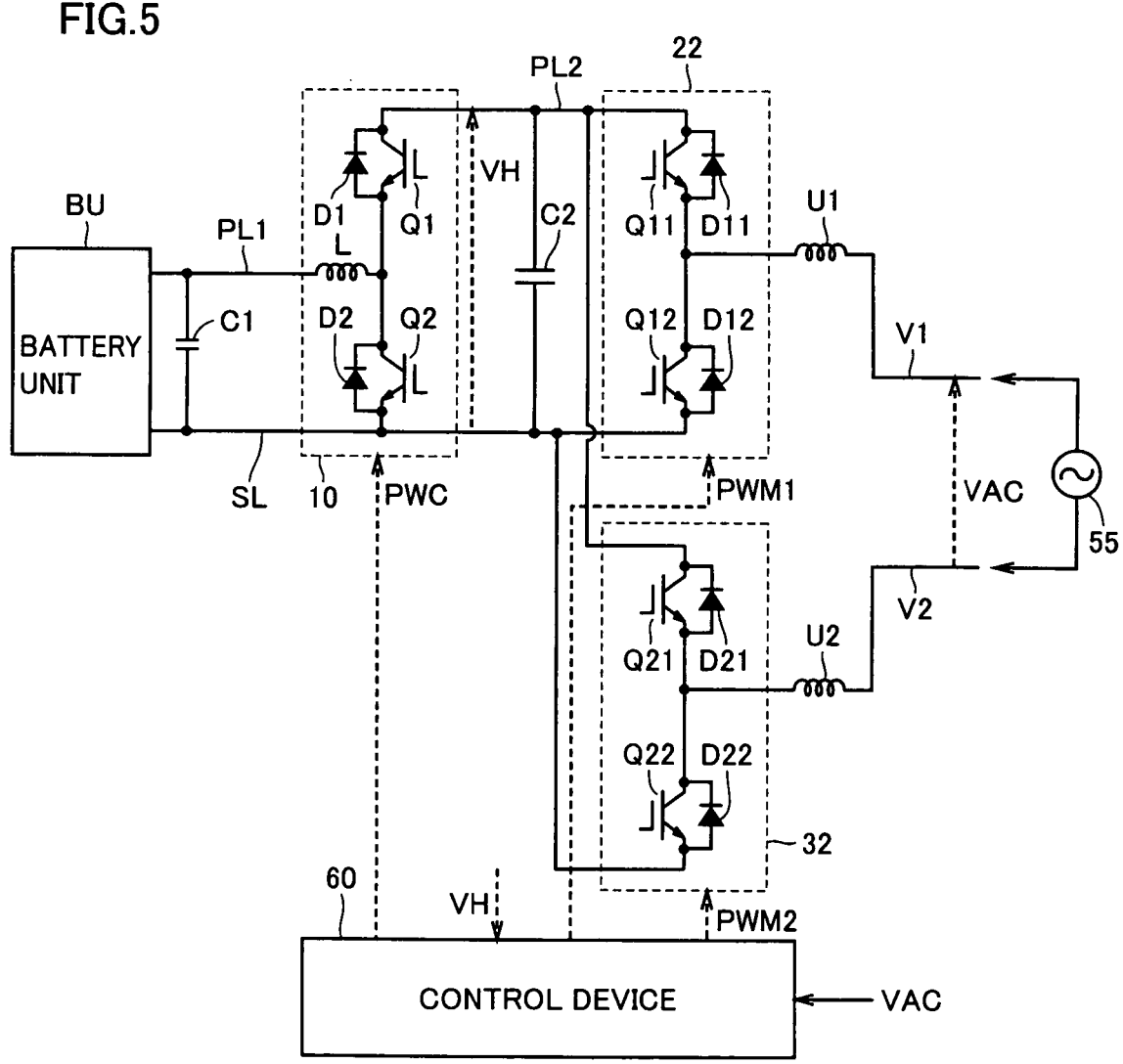
FIG. 5 is a diagram showing the circuit diagram in FIG. 1, which circuit diagram is simplified to focus on a portion relating to charging.

FIG. 5 is a diagram showing the circuit diagram in FIG. 1, which circuit diagram is simplified to focus on a portion relating to charging.

In FIG. 5, the U-phase arm in each of inverters 20, 30 in FIG. 1 is shown as a representative example. Furthermore, the U-phase coil out of three-phase coils in each of the motor generators is shown as a representative example. If a description of the U-phase is made as a representative example, an in-phase current flows through the coils of each of the phases, and hence the circuits of other two phases operate similarly to that of the U-phase. As seen from FIG. 5, each of a set of U-phase coil U1 and U-phase arm 22 and a set of U-phase coil U2 and U-phase arm 32 has a configuration similar to that of voltage step up converter 10. Accordingly, it is possible to convert an alternating voltage of 100V, for example, into a direct voltage, and further step up the direct voltage to a battery charging voltage of approximately 200V.

Figures 6, 7:
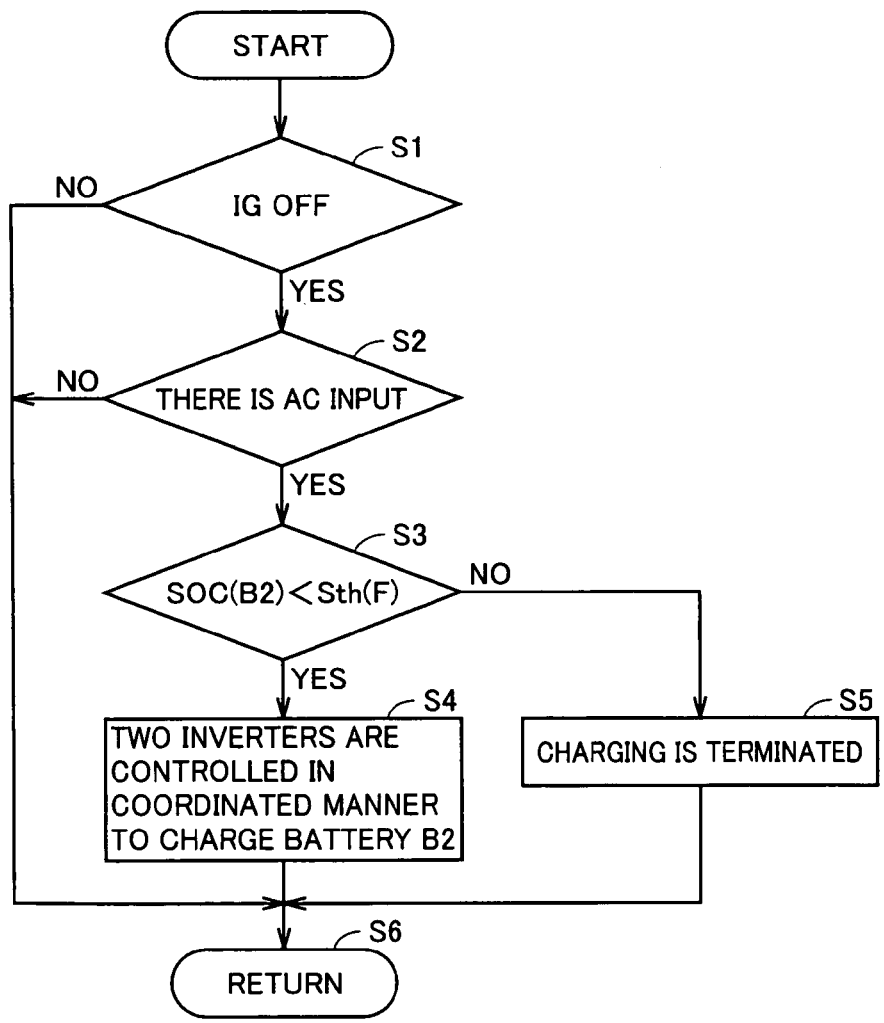
FIG. 6 is a diagram showing control states of transistors during charging.
FIG. 7 is a flowchart showing a control structure of a program relating to a determination as to the start of charging, which determination is made by control device 60 shown in FIG. 1.

FIG. 6 is a diagram showing control states of the transistors during charging.

With reference to FIGS. 5 and 6, initially, if voltage VAC>0, in other words, a voltage V1 on line ACL1 is higher than a voltage V2 on line ACL2, transistor Q1 in the voltage step up converter is brought into an on state, while transistor Q2 in the voltage step up converter is brought into an off state. Voltage step up converter 10 can thereby allow a charging current to flow from power supply line PL2 to power supply line PL1.

In the first inverter, transistor Q12 is switched in a cycle and at a duty ratio in accordance with voltage VAC, while transistor Q11 is controlled to be in an off state or in a switching state in which transistor Q11 is brought into conduction in synchronization with the conduction of diode D11. At that time, in the second inverter, transistor Q21 is brought into an off state, while transistor Q22 is controlled to be in an on state.

If voltage VAC>0, a current flows through a path from coil U1 through transistor Q12 and diode D22 to coil U2, with transistor Q12 being in an on state. The energy stored in coils U1, U2 at that time is released when transistor Q12 is brought into an off state, and a current flows through diode D11 to power supply line PL2. In order to reduce loss due to diode D11, transistor Q11 may be brought into conduction in synchronization with the conduction period of diode D11. Based on the values of voltage VAC and voltage VH, a voltage step up ratio is determined, so that a switching cycle and a duty ratio of transistor Q12 are determined.

Next, if voltage VAC<0, in other words, voltage V1 on line ACL1 is lower than voltage V2 on line ACL2, transistor Q1 in the voltage step up converter is brought into an on state, while transistor Q2 in the voltage step up converter is brought into an off state. Voltage step up converter 10 can thereby allow a charging current to flow from power supply line PL2 to power supply line PL1.

In the second inverter, transistor Q22 is switched in a cycle and at a duty ratio in accordance with voltage VAC, while transistor Q21 is controlled to be in an off state or in a switching state in which transistor Q21 is brought into conduction in synchronization with the conduction of diode D21. At that time, in the first inverter, transistor Q11 is brought into an off state, while transistor Q12 is controlled to be in an on state.

If voltage VAC<0, a current flows through a path from coil U2 through transistor Q22 and diode D12 to coil U1, with transistor Q22 being in an on state. The energy stored in coils U1, U2 at that time is released when transistor Q22 is brought into an off state, and a current flows through diode D21 to power supply line PL2. In order to reduce loss due to diode D21, transistor Q21 may be brought into conduction in synchronization with the conduction period of diode D21. At that time, based on the values of voltage VAC and voltage VH, a voltage step up ratio is also determined, so that a switching cycle and a duty ratio of transistor Q22 are determined.

FIG. 7 is a flowchart showing a control structure of a program relating to a determination as to the start of charging, which determination is made by control device 60 shown in FIG. 1. The process in the flowchart is called from a main routine whenever certain time has passed or a prescribed condition is established, for execution.

With reference to FIGS. 1 and 7, initially in step S1, control device 60 determines whether or not signal IG is in an off state. If signal IG is not in an off state in step S1, it is not suitable for a charging cable to be connected to the vehicle for charging. Accordingly, the process proceeds to step S6, and the control is moved to the main routine.

In step S1, if signal IG is in an off state, it is determined that the state is suitable for charging, and the process proceeds to step S2. In step S2, relays RY1 and RY2 are controlled to be in a conduction state from a non-conduction state, and voltage VAC is measured by voltage sensor 74. If an alternating voltage is not observed, it is assumed that the charging cable is not connected to a socket of connector 50, and hence charging is not performed and the process proceeds to step S6. The control is returned to the main routine.

In contrast, if an alternating voltage is observed as voltage VAC in step S2, the process proceeds to step S3. In step 3, it is determined whether or not the state of charge of battery B2 SOC (B2) is lower than a threshold value Sth (F) indicative of a fully-charged state.

If SOC (B2)<Sth (F) is established, battery B2 is in a chargeable state, and hence the process proceeds to step S4. In step S4, control device 60 controls the two inverters in a coordinated manner to charge battery B2.

In step S3, if SOC (B2)<Sth (F) is not established, battery B2 is in a fully-charged state, and requires no charging. The process therefore proceeds to step S5. In step S5, a charging termination process is performed. Specifically, inverters 20 and 30 are stopped and relays RY1, RY2 are released, so that an input of the alternating-current electric power to vehicle 100 is shut off. The process proceeds to step S6, and the control is returned to the main routine.

Figure 8:
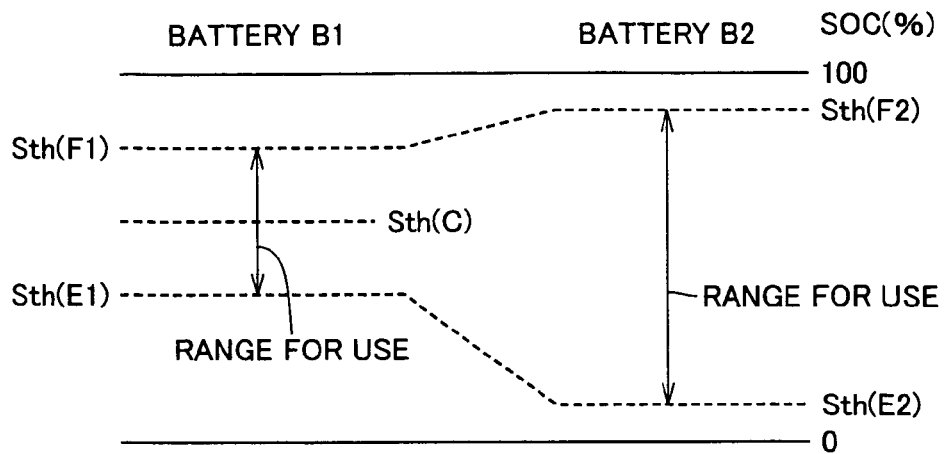
FIG. 8 is a conceptual diagram for describing a difference in characteristic between batteries B1, B2 in FIG. 1.

FIG. 8 is a conceptual diagram for describing a difference in characteristic between batteries B1, B2 in FIG. 1.

As described above, in battery unit BU, a combination of batteries B1, B2 is selected such that battery B2 has a power storage capacity higher than a power storage capacity of battery B1, and instead that battery B1 has maximum capable output electric power larger than maximum capable output electric power of battery B2.

When a secondary battery such as a nickel metal hydride battery or a lithium-ion battery is used for battery B1 and an inexpensive, high-capacity, lead-acid battery is used for battery B2, a range for use is set in each of the batteries as shown in FIG. 8.

The range for use of battery B1 is controlled to fall within the range having the lower limit of Sth (E1) and the upper limit of Sth (F1), while a state where SOC is at Sth (C) is set as a standard condition. For example, Sth (C)=60%, Sth (E1)=40%, and Sth (F1)=80%. As to the secondary battery such as a nickel metal hydride battery or the lithium-ion battery, if the SOC is controlled to be such an intermediate value, it can achieve improved charging performance for a long period of time.

In contrast, the range for use of battery B2 is controlled to fall within the range having the lower limit of Sth (E2) and the upper limit of Sth (F2). Here, Sth (E2)<Sth (E1) and Sth (F2)>Sth (F1). For example, Sth (E2)=10%, and Sth (F2)=90%.

Figure 9:
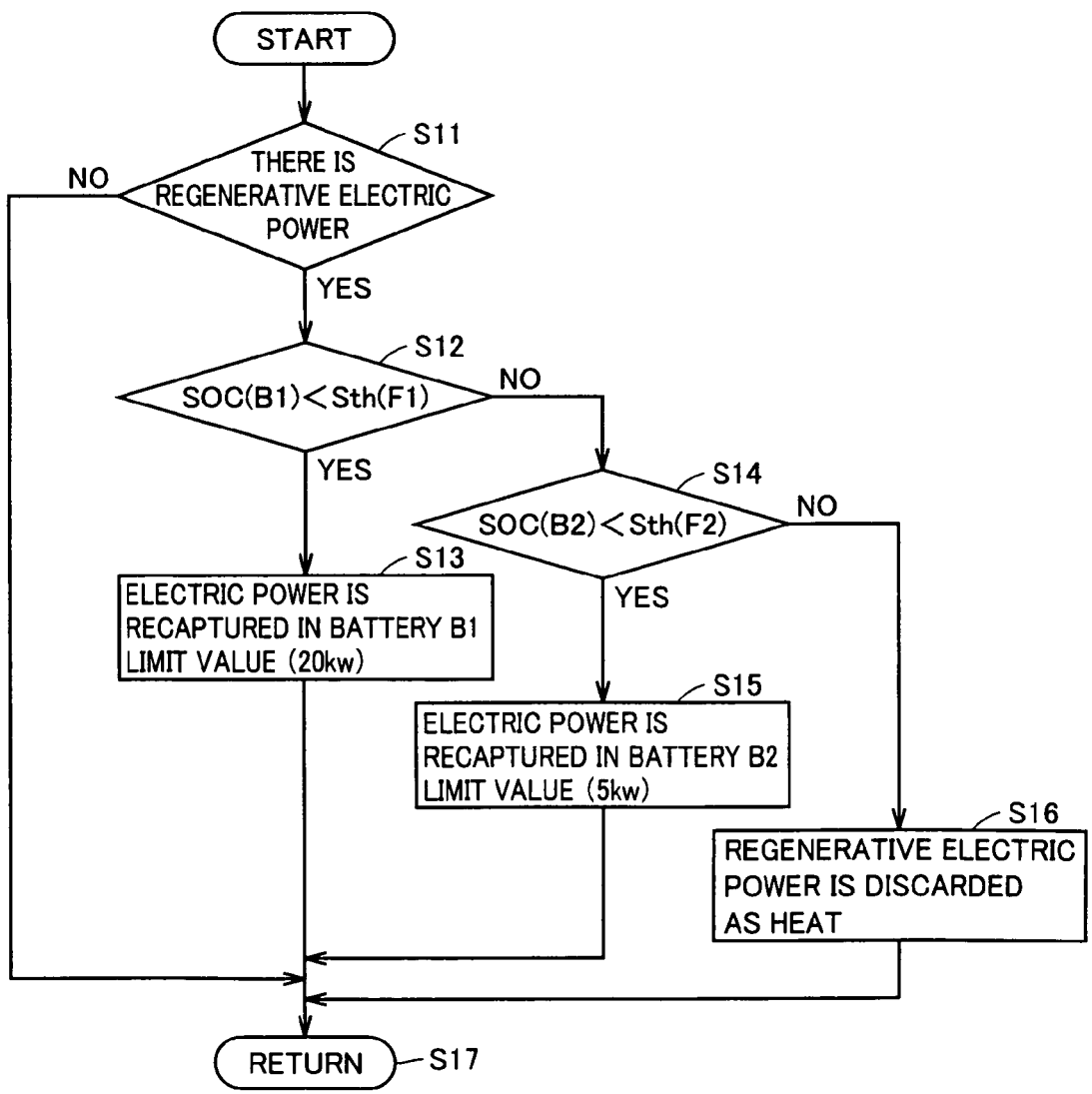
FIG. 9 is a flowchart showing a control structure of a program relating to battery selection in recapturing regenerative electric power, which battery selection is made by control device 60 in FIG. 1.

FIG. 9 is a flowchart showing a control structure of a program relating to battery selection in recapturing regenerative electric power, which battery selection is made by control device 60 in FIG. 1. The process in the flowchart is called from the main routine whenever certain time has passed, or a prescribed condition is established, for execution.

With reference to FIGS. 1 and 9, the power supply device of vehicle 100 has a battery B1 serving as a first power storage device, a battery B2 serving as a second power storage device, a motor generator MG2 driving a wheel, selection switch RY0 selecting one of the first and second power storage devices and connecting the selected power storage device to motor generator MG2, and control device 60 controlling switching of selection switch RY0 in accordance with the state of charge of each of the first and second power storage devices. In the case where the selection switch RY0 selects battery B1, and when the state of charge of battery B1 becomes higher than a first prescribed level by charging, control device 60 instructs the selection switch to switch selection to the second power storage device.

At that time, the charging in the case where selection switch RY0 selects battery B1 is preferably performed with regenerative electric power generated during a regenerative braking operation of motor generator MG2 during running of the vehicle.

Preferably, in the case where the selection switch selects battery B2, and when the state of charge of battery B2 becomes lower than a second prescribed level, control device 60 instructs the selection switch to switch selection to the first power storage device. The second prescribed level may be set to be equal to the first prescribed level and set to Sth (C), or alternatively, both of the first and second prescribed levels may be set to different values.

The charging operation above will now be described in detail. Initially, when the process starts, control device 60 determines in step S11 whether or not there is regenerative electric power. For example, in the case of deceleration from high-speed running, or in the case of braking to prevent acceleration in a downslope, the vehicle generates electric power by means of motor generator MG2 mechanically coupled to the wheel, and recaptures the electric power. Such a case corresponds to the case where there is regenerative electric power.

In step S11, if there is no regenerative electric power, the process proceeds to step S17, and the control is moved to the main routine. In contrast, if there is regenerative electric power in step S11, the process proceeds to step S12. In step S12, it is determined whether or not the state of charge of battery B1 SOC (B1) is lower than prescribed threshold value Sth (F1) in FIG. 8.

If SOC (B1)<Sth (F1) is established in step S12, the process proceeds to step S13, and battery B1 is selected as a place where the recaptured electric power is to be stored. A recaptured electric power limit value at that time is set to, for example, 20 kW. If regenerative electric power is generated beyond the limit value, excess electric power is discarded as heat.

In contrast, if SOC (B1)<Sth (F1) is not established in step S12, the process proceeds to step S14. In step S14, it is determined whether or not the state of charge of battery B2 SOC (B2) is lower than prescribed threshold value Sth (F2) in FIG. 8.

If SOC (B2)<Sth (F2) is established in step S14, the process proceeds to step S15, and battery B2 is selected as a place where the recaptured electric power is to be stored. A recaptured electric power limit value at that time is set to, for example, 5 kW. If regenerative electric power is generated beyond the limit value, excess electric power is discarded as heat.

In contrast, if SOC (B2)<Sth (F2) is not established in step S14, it is determined that additional electric power cannot be recaptured in the batteries, and hence the process proceeds to step S16. In step S16, the regenerative electric power is discarded as heat.

If any of the steps in steps S13, S15, and S16 is terminated, the process proceeds to step S17, and the control is moved to the main routine.

Figure 10:
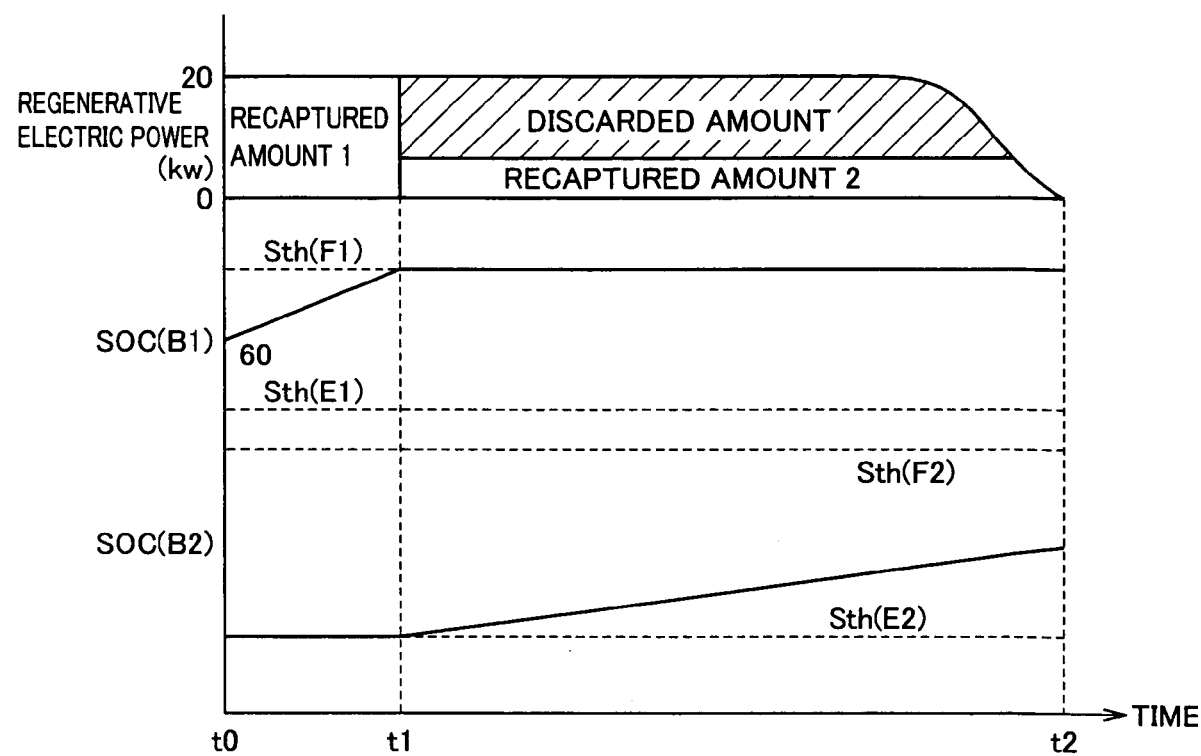
FIG. 10 is a diagram for describing recapture of regenerative electric power in the first embodiment.

FIG. 10 is a diagram for describing recapture of regenerative electric power in the first embodiment.

With reference to FIG. 10, battery B1 is charged at time t0-t1, and thereby a recaptured amount 1 of regenerative electric power is recaptured. At time t1, when the SOC of battery B1 reaches Sth (F1) indicative of a fully-charged state, control device 60 allows the process to proceed from step S12 to step S14 in FIG. 9. Since the SOC of battery B2 is at Sth (E2) indicative of an almost empty state, battery B2 is selected as a place where regenerative electric power is stored, and the process in step S15 proceeds.

A recaptured amount 2 of electric power is stored at time t1-t2, resulting in that the SOC of battery B2 gradually increases. In other words, an additional amount of electric power, which corresponds to recaptured amount 2 of electric power, is recaptured, when compared with the case in FIG. 15, and hence energy efficiency is improved.

Figure 11:
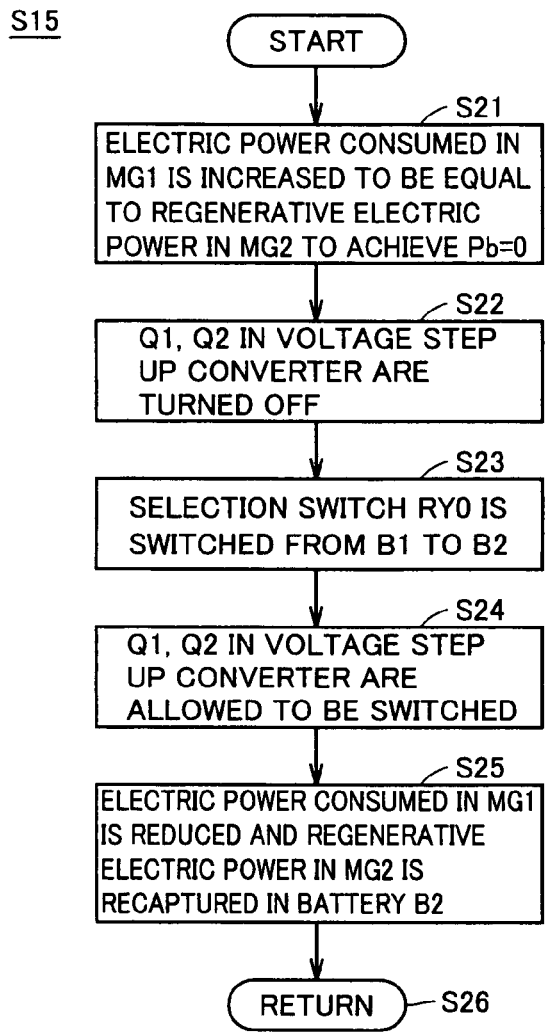
FIG. 11 is a flowchart for describing a procedure of a battery switching process in FIG. 9.

FIG. 11 is a flowchart for describing a procedure of a battery switching process in FIG. 9. The process in FIG. 11 is executed in step S15 in FIG. 9.

Initially, when the process is initiated, electric power consumed in motor generator MG1 in FIG. 1 is increased to be equal to regenerative electric power generated in motor generator MG2 by mechanical motive power received from wheel 2, and adjusts battery power Pb, which is input to and output from battery unit BU, to be 0 in step S21. Specifically, motor generator MG1 is controlled such that, for example, a battery current IB1 input to and output from battery B1 is set to be 0.

Figure 12:
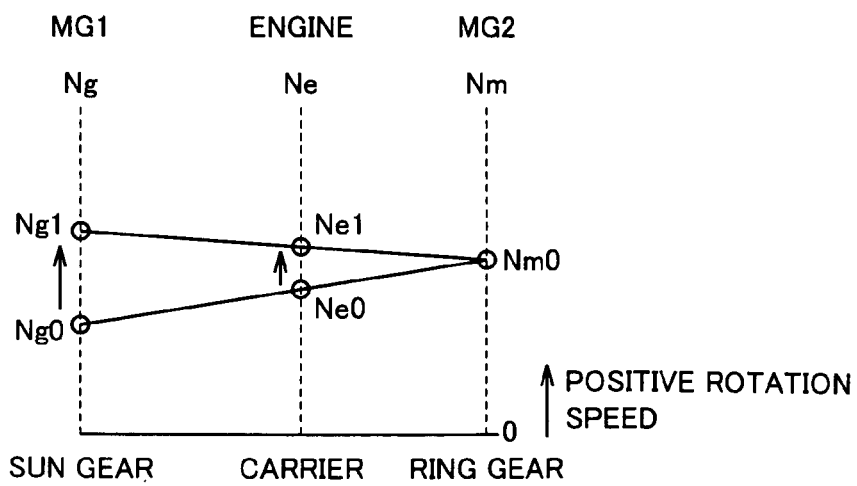
FIG. 12 is a diagram for describing changes in rotation speed of a motor generator MG1.

FIG. 12 is a diagram for describing changes in rotation speed of motor generator MG1.

With reference to FIG. 12, the rotary shaft of motor generator MG1 is coupled to the sun gear in the planetary gear serving as power split device 3 in FIG. 1. Furthermore, the crankshaft of engine 4 is coupled to the planetary carrier in the planetary gear. The rotary shaft of motor generator MG2 is coupled to the ring gear in the planetary gear unit.

Initially, assume that motor generator MG2 is controlled to have a rotation speed of Nm0, the engine is controlled to have a rotation speed of Ne0, and motor generator MG1 is controlled to have a rotation speed of Ng0, in a downslope. In this state, motor generator MG2 causes wheel 2 to receive negative torque and performs regenerative braking to generate regenerative electric power. In this state, the generated regenerative electric power flows into battery B1 in battery unit BU through selection switch RY0.

If selection switch RY0 is switched in this state, the life of the selection switch may adversely be affected. For example, sparks are generated during switching, and contacts are resultantly welded. Accordingly, at the instant of switching batteries, there is generated a state where a current is prevented from flowing into battery unit BU by using motor generator MG1.

Specifically, for example, the engine is brought into a fuel cut-off state, and the rotation speed of motor generator MG1 is increased from Ng0 to Ng1. At that time, the rotation speed of the engine is increased from Ne0 to Ne1 accordingly. The engine in the fuel cut-off state repeatedly compresses air, and hence consumes power owing to pumping loss. To rotate the engine, motor generator MG1 consumes electric power. As a result, it is possible to realize a state where battery power Pb regenerated and stored in battery unit BU reaches 0.

Next, the process proceeds to step S22. Control device 60 controls transistors Q1, Q2 in voltage step up converter 10 to be in an off state. It is thereby ensured that the current flowing into battery unit BU reaches 0.

In step S23, control device 60 switches selection switch RY0 from a state where battery B1 is selected to a state where battery B2 is selected. At that time, the current flowing into battery unit BU reaches 0, and hence no spark is generated when the contacts are switched. The process then proceeds to step S24. Control device 60 allows transistors Q1, Q2 in voltage step up converter 10 to be switched, so that voltage step up converter 10 is brought into a state where it can output the regenerated electric power at an voltage suitable for charging of battery B2.

In step S25, electric power consumed in motor generator MG1 is reduced, and regenerative electric power generated in motor generator MG2 is recaptured in battery B2. The process then proceeds to step S26, and the control returns to the flowchart in FIG. 9.

Note that selection switch RY0 can be switched even if the processes in step S22 and step S24 are not performed. Furthermore, switching may be performed by reducing the current flowing into battery unit BU to a current value allowable for selection switch RY0, without precisely reducing the current to 0.

As described above, in the first embodiment, electric power consumed in motor generator MG1 is temporarily increased to decrease a current flowing into battery unit BU, so as to switch batteries when regenerative electric power is generated in motor generator MG2. It is thereby possible to prolong the life of selection switch RY0 when a relay or the like is used for the switch, and hence realize both of longer life and electric power saving.

Second Embodiment

Figure 13:
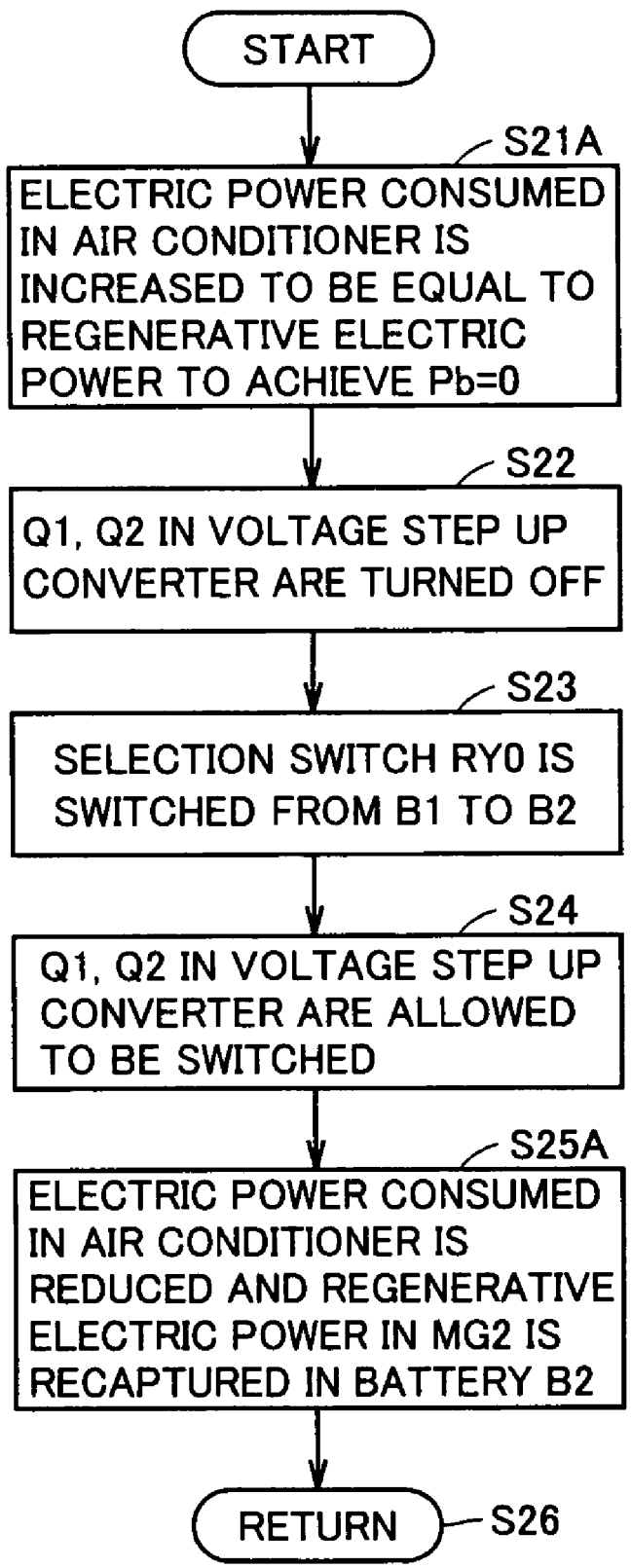
FIG. 13 is a flowchart showing a structure of a process relating to battery switching executed in a second embodiment.

FIG. 13 is a flowchart showing a structure of a process relating to battery switching executed in a second embodiment. The flowchart in FIG. 13 also shows a process executed instead of step S15 in FIG. 9, namely, step S15A.

Reference is made to FIG. 13. Initially, when the process is initiated, electric power consumed in air conditioner 90 in FIG. 1 is increased to be equal to regenerative electric power generated in motor generator MG2, so that battery power Pb, which is input to and output from battery unit BU, is resultantly made to be 0 in step S21A. Specifically, electric power of the air conditioner may be adjusted such that a current value IB1 sensed by current sensor 84 is made to be 0.

Successively, the processes in step S22-S24 are executed. Note that the processes in step S22-S24 are the same as those described in FIG. 11, and hence the description thereof will not be repeated.

When the process in step S24 is completed, electric power consumed in air conditioner 90 is reduced and regenerative electric power in motor generator MG2 is recaptured by battery B2 in step S25A. The process then proceeds to step S26, and the control is moved to the flowchart in FIG. 9.

An air conditioner is taken as an example of an air-conditioning and heating device. However, electric power consumed in a heater such as a seat heater or a window heater may temporarily be increased as well, to thereby make battery power Pb closer to 0. Furthermore, the processes in steps S22, S24 may be omitted.

Third Embodiment

In a third embodiment, regenerative braking by motor generator MG2 is temporarily stopped. Therefore, a process in step S15B is performed instead of the process in step S15 in FIG. 9.

FIG. 14 is a flowchart showing a structure of a process relating to battery switching executed in a third embodiment.

With reference to FIG. 14, initially in the process in step S15B, regenerative braking by motor generator MG2 is initially stopped, and instead of this, regenerative braking is switched to brake 92 that frictionally brakes wheel 2, so that control is provided to prevent excessive acceleration in a downslope, in step S21B.

The following processes in steps S22-S24 are the same as those described in FIG. 11, and hence the description thereof will not be repeated.

In step S25B, braking force of brake 92 caused by friction is reduced, regenerative braking by motor generator MG2 is resumed, and regenerative electric power generated by the regenerative braking is recaptured in battery B2. Successively in step S26, the control is moved to the flowchart in FIG. 9.

In step S21B, even without completely prohibiting regenerative braking, reducing regenerative electric power to a current value low enough to shut down the relay also produces an effect of prolonging the life of the selection switch. Furthermore, the processes in steps S22, S24 may be omitted.

Alternatively, it may be possible to realize the state where a current flowing through the selection switch is reduced, by combining as appropriate the increase in electric power consumed in motor generator MG1 as in the first embodiment, the increase in electric power consumed in an air conditioner or the like as in the second embodiment, and the reduction in regenerative electric power by switching to a friction brake or additionally using a friction brake as in the third embodiment, so as to switch batteries.

As described above, according to the embodiments of the present invention, it is possible to further recapture additional regenerative electric power in battery B2, when compared with a normal hybrid vehicle. Accordingly, if there is a mountain pass in a commuting route, it is possible to increase mileage per charge, and hence the frequency at which fuel is consumed is decreased, and the frequency of refueling is further decreased.

Furthermore, it is possible to prolong the life of the selection switch when battery switching is performed with the selection switch.

In the present embodiment, there is particularly described, as an example, the case where the selection switch is switched during charging with regenerative electric power. However, the present invention is not limited thereto. For example, even when a battery is discharged, the selection switch may be switched by temporarily controlling electric power consumed by a vehicle load to be small, and suppressing a current flowing through the selection switch to be equal to or smaller than a prescribed value. Specifically, for example, the selection switch may be switched by temporarily transmitting engine torque, instead of motor torque, to a wheel during running, and suppressing electric power consumption. Alternatively, for example, when a battery is discharged owing to electric power consumed by the air conditioner while the vehicle runs or is stopped, the selection switch may be switched by temporarily reducing electric power consumed in the air conditioner.

It should be understood that the embodiments disclosed herein are illustrative and not limitative in all aspects. The scope of the present invention is shown not by the description above but by the scope of the claims, and is intended to include all modifications within the equivalent meaning and scope of the claims.

The invention claimed is:

1. A power supply device for a vehicle, comprising:
a first power storage device;
a second power storage device;
a vehicle load which includes at least a first inverter driving a first rotating electric machine;
a selection switch which selects one of said first and second power storage devices and connects the selected power storage device to said vehicle load; and
a control device which makes a current flowing through said selection switch smaller than a prescribed value by using said first inverter to control electric power generated in said first rotating electric machine and switches said selection switch, when the current flowing through said selection switch is larger than said prescribed value.

2. The power supply device for the vehicle according to claim 1, wherein
said vehicle load includes
said first rotating electric machine,
a second rotating electric machine, and
a second inverter provided to correspond to said second rotating electric machine, and
when said control device switches said selection switch, said control device controls said first and second inverters to achieve a balance between the electric power generated in said first rotating electric machine and electric power consumed in said second rotating electric machine.

3. The power supply device for the vehicle according to claim 2, wherein motive power is mechanically transmitted between a rotary shaft of said first rotating electric machine and a wheel, and said vehicle includes an internal combustion engine, motive power being mechanically transmitted between a rotary shaft of said second rotating electric machine and a crankshaft of said internal combustion engine.

4. The power supply device for the vehicle according to claim 1, wherein
said vehicle load includes
said first rotating electric machine, and
an apparatus performing at least one of cooling and heating, and
when said control device switches said selection switch, said control device controls said first inverter and said apparatus to achieve a balance between the electric power generated in said first rotating electric machine and electric power consumed in said apparatus.

5. The power supply device for the vehicle according to claim 1, wherein
said first rotating electric machine has a rotary shaft coupled to a wheel via means for mechanically transmitting motive power,
said vehicle includes a brake which frictionally brakes said wheel, and
said control device causes said first rotating electric machine to restrict a regenerative braking operation and operates said brake in response to a braking demand, when said control device switches said selection switch.

6. The power supply device for the vehicle according to claim 1, wherein when switching of said selection switch is completed, said control device brings a control state of said vehicle load back to a state prior to the switching of said selection switch.

7. The power supply device for the vehicle according to claim 1, wherein said second power storage device has a power storage capacity higher than a power storage capacity of said first power storage device.

8. The power supply device for the vehicle according to claim 1, wherein said first power storage device has a maximum capable output electric power larger than a maximum capable output electric power of said second power storage device.

9. The power supply device for the vehicle according to claim 1, further comprising an input unit for receiving electric power provided from an outside of the vehicle and charging at least said second power storage device.

10. The power supply device for the vehicle according to claim 9, wherein
said vehicle load includes
said first rotating electric machine,
a second rotating electric machine, and
a second inverter provided to correspond to said second rotating electric machine,
said input unit includes
a first terminal connected to said first rotating electric machine, and
a second terminal connected to said second rotating electric machine, and said power supply device for the vehicle further comprises the control device which controls said first and second inverters such that alternating-current electric power provided to said first and second terminals is converted into direct-current electric power and provided to said second power storage device.

11. The power supply device for the vehicle according to claim 10, wherein
motive power is mechanically transmitted between a rotary shaft of said first rotating electric machine and a wheel, and said vehicle includes an internal combustion engine, motive power being mechanically transmitted between a rotary shaft of said second rotating electric machine and a crankshaft of said internal combustion engine.

12. A method of controlling a power supply device for a vehicle, the power supply device for the vehicle having a first power storage device, a second power storage device, a vehicle load which includes at least a first inverter driving a first rotating electric machine, and a selection switch which selects one of said first and second power storage devices and connects the selected power storage device to said vehicle load, said method comprising:
the step of making a current flowing through said selection switch smaller than a prescribed value by using said first inverter to control electric power generated in said first rotating electric machine, when the current flowing through said selection switch is larger than said prescribed value; and
the step of switching said selection switch after making the current flowing through said selection switch smaller than said prescribed value.

13. The method of controlling the power supply device for the vehicle according to claim 12, wherein
said vehicle load includes
said first rotating electric machine,
a second rotating electric machine, and
a second inverter provided to correspond to said second rotating electric machine, and
said step of making the current smaller than said prescribed value controls said first and second inverters to achieve a balance between the electric power generated in said first rotating electric machine and electric power consumed in said second rotating electric machine.

14. The method of controlling the power supply device for the vehicle according to claim 13, wherein
motive power is mechanically transmitted between a rotary shaft of said first rotating electric machine and a wheel, and
said vehicle includes an internal combustion engine, motive power being mechanically transmitted between a rotary shaft of said second rotating electric machine and a crankshaft of said internal combustion engine.

15. The method of controlling the power supply device for the vehicle according to claim 12, wherein
said vehicle load includes
said first rotating electric machine, and
an apparatus performing at least one of cooling and heating, and
said step of making the current smaller than said prescribed value controls said first inverter and said apparatus to achieve a balance between the electric power generated in said first rotating electric machine and electric power consumed in said apparatus.

16. The method of controlling the power supply device for the vehicle according to claim 12, wherein
said first rotating electric machine has a rotary shaft coupled to a wheel via means for mechanically transmitting motive power,
said vehicle includes a brake which frictionally brakes said wheel, and
said step of making the current smaller than said prescribed value causes said first rotating electric machine to restrict a regenerative braking operation and operates said brake in response to a braking demand, when said selection switch is switched.

17. The method of controlling the power supply device for the vehicle according to claim 12, further comprising the step of, when switching of said selection switch is completed, bringing a control state of said vehicle load back to a state prior to the switching of said selection switch.

18. The method of controlling the power supply device for the vehicle according to claim 12, wherein said second power storage device has a power storage capacity higher than a power storage capacity of said first power storage device.

19. The method of controlling the power supply device for the vehicle according to claim 12, wherein said first power storage device has a maximum capable output electric power larger than a maximum capable output electric power of said second power storage device.

* * * * *